Patented Oct. 22, 1929

1,732,375

UNITED STATES PATENT OFFICE

SAMUEL C. NYGOOD, OF NEW YORK, N. Y., ASSIGNOR OF ONE-HALF TO THEODORE P. GRANT, DOING BUSINESS AS T. P. GRANT COMPANY, A CORPORATION OF MASSACHUSETTS

METHOD OF MAKING DAIRY-PRODUCT COMPOSITION

No Drawing.   Application filed October 11, 1926.   Serial No. 141,027.

In the art of cheese, it has been desired to produce certain types of cheese having the flavor of certain other types. For example, it has been proposed to make a soft or cream cheese having the flavor of certain hard or cured cheeses having characteristic flavor peculiar to themselves.

Most of the attempts to combine such results have been along the line of mere admixture of one kind of cheese with another kind of cheese with a result that was of a composite character, being neither one thing or the other, and generally differing from either of its components in physical characteristics and in flavor.

My present invention contemplates the production of a cheese of one kind having the full flavor of another kind of cheese while retaining its original physical characteristics. This result, attained by my invention, has certain actual advantages from the manufacturer's point of view, and to some extent also from the dietitian's point of view, but it, of course, has its prime importance in the epicurean discrimination of the public. It is well known that many people prefer a soft, or uncured, or cream type of cheese, to a hard or cured cheese, while perhaps at the same time having a keen appreciation of the flavors of the hard types of cheeses.

From this has risen the demand which has led to the concept of my present invention. In accordance with this concept, I am able to produce for example, a cream cheese of practically any desired flavor, as for example the flavor of Roquefort, of Camembert, of Brie, or of any cheese of recognized or available bacteriological foundation.

As illustrative of my invention, I will describe the manufacture of a characteristic cheese which in itself constitutes a highly desirable product. Such an example will make clear to those skilled in the art the various possibilities of manufacturing other cheeses of different types and of other flavors.

As has been known to those skilled in the art, the presence of normal lactic acid forming bacteria such as the streptococcus lactarius in milk prevents the development of other putrefactive bacteria, and it has been recognized that this condition continues up to a certain point of acid development in the souring of the milk after which the number and virility of the bacteria seem to be reduced, or weakened so that other bacterial types may be introduced and developed. According to my invention, I utilize this principle, as will appear from the following illustrative example. To make a cream type of cheese with for example a Roquefort flavor, I may start with sweet milk, or with sour milk or even curd. In the case of sweet milk, I inoculate with lactic ferment culture, and in any case age until the acidity is sufficient to preclude any preponderance of streptococcus lactarius. The sour milk, or curd, is preferably aged from five to seven days and is then inoculated with any of the desired micro-organisms, as in the example selected penicillium roqueforti. To produce a Camembert flavor, I may inoculate with penicillium camemberti, or other well-known plant organisms and/or bacteria may be used.

In case a reliable culture cannot be obtained from commercial sources as by utilizing commercial cheese having the type of bacteria desired, it is necessary that a laboratory culture be secured. Once, of course, that a proper culture has been established, operations may be continued by breeding the bacteria from batch to batch, or by maintaining standard cultures which can be used. With such a culture, however, attained, I inoculate the sour curd which preferably is left for three or four days so that the bacteria can develop throughout the entire mass.

The material is then preferably placed in bags and drained, and the result constitutes a bacteria component element which may be introduced into the ordinary cream cheese which may be either fresh or aged.

The modified cream cheese should then be ripened for at least a week in order to secure the best results. After this, it will keep for many months.

In preparing the bacteria component, I use about 25% of culture which, for example, may be growth development on bread in which the desired organisms have been developed as high as possible. Such a culture will rapidly impart to the 75% of sour milk, or curd, such a complete impregnation or colonization as will render it capable of rapidly transmitting an active bacteriological permeation of the cream cheese with which it is combined. In embodying the bacterial component with the cream cheese, I use only about 5% of it to 95% of the cheese. As the resultant mixture only contains about 5% of the bacterial component and the starter in turn had only about 25% of the original culture, it will be seen that the flavor of the product represents a bacteriological development principally engendered within the product itself.

The character of the product is, therefore, not changed as in the case of mere mixtures of hard and soft cheese, and the cheese produced will be in physical form and texture a fine, smooth, cream cheese, but with the full and pronounced tan of so-called Roquefort, Gorgongola or Stilton types of cheese which are hard cheeses of entirely different physical characteristics.

In the same way as suggested above, I can produce the cream cheese fully flavored with what is known as the flavor of Camembert cheese, and so all through the long list of cheese flavors which are so well recognized and which are so highly appreciated by many.

Various modifications may obviously be made in the practice of my invention and various ingredients may be employed all without departing from the spirit of my invention as found in the appended claim.

What I therefore claim and desire to secure by Letters Patent is:

The method of producing cheese types consisting in reducing the bacterial resistance of the putrefactive ferment of a sour milk base, in inoculating said base with a penicillium type organism and in developing a soft cultured component therefrom, and in combining said component with a larger body of soft cheese to produce a substantially homogeneous modified cream cheese of uniformly distributed bacterially engendered flavor.

SAMUEL C. NYGOOD.